US009838671B2

(12) United States Patent
de la Barré et al.

(10) Patent No.: US 9,838,671 B2
(45) Date of Patent: Dec. 5, 2017

(54) AUTOSTEREOSCOPIC SCREEN AND METHOD FOR REPRODUCING IMAGE INFORMATION

(75) Inventors: René de la Barré, Mittweida (DE); Silvio Jurk, Berlin (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 762 days.

(21) Appl. No.: 14/116,948

(22) PCT Filed: Feb. 6, 2012

(86) PCT No.: PCT/EP2012/000744
§ 371 (c)(1),
(2), (4) Date: Nov. 11, 2013

(87) PCT Pub. No.: WO2012/152346
PCT Pub. Date: Nov. 15, 2012

(65) Prior Publication Data
US 2014/0071253 A1    Mar. 13, 2014

(30) Foreign Application Priority Data

May 12, 2011    (DE) .................. 10 2011 101 440

(51) Int. Cl.
H04N 13/04    (2006.01)
(52) U.S. Cl.
CPC ......... H04N 13/04 (2013.01); H04N 13/0404 (2013.01); H04N 13/0415 (2013.01); H04N 13/0422 (2013.01); H04N 13/0477 (2013.01)
(58) Field of Classification Search
CPC ........... H04N 13/0404; H04N 13/0415; H04N 13/04; H04N 13/0477; H04N 13/0422
(Continued)

(56) References Cited

U.S. PATENT DOCUMENTS 6,307,585 B1 * 10/2001 Hentschke ......... G02B 27/2214
348/51
7,839,430 B2    11/2010 Hentschke
(Continued)

FOREIGN PATENT DOCUMENTS

DE    102006031799 B3    1/2008
GB    2406730 A    4/2005
WO    WO-00/28517 A1    5/2000

OTHER PUBLICATIONS

"International Application No. PCT/EP2012/000744, International Search Report and Written Opinion dated Apr. 26, 2012", (dated Apr. 26, 2012), 11 pgs.

Primary Examiner — Mohammed Rahaman
Assistant Examiner — Richard Carter
(74) Attorney, Agent, or Firm — Schwegman Lundberg & Woessner, P.A.

(57) ABSTRACT

The present invention relates to an autostereoscopic screen for the simultaneous reproduction of at least two different images, in a manner such that each of these images is visible from at least one of different viewing zones, comprising a subpixel matrix, an optical element and a control unit, wherein the control unit is configured, on the subpixel matrix, to define different subsets of subpixels such that each of the subsets forms a family of parallel strips and is assigned to at least one of the viewing zones, wherein the strips of the different subsets cyclically alternate, and to activate the subpixels in dependence on image data such that each of the images is reproduced on one of the subsets, wherein the optical element has a grating-like structure aligned according to the strips, in order to lead light departing from the subpixels of each of the subsets into the viewing zone assigned to this subgroup. Thereby, the control unit is further configured to define the subsets such that two of subsets overlap, and to activate the subpixels within an (Continued)

intersection of these subsets, in each case with an averaged intensity value. The invention further relates to a suitable method for reproducing image information on an autostereoscopic screen.

15 Claims, 6 Drawing Sheets

(58) Field of Classification Search
USPC ............... 348/51; 359/3, 462; 345/419, 589
See application file for complete search history.

(56) References Cited

U.S. PATENT DOCUMENTS

| | | | |
|---|---|---|---|
| 2003/0067539 A1* | 4/2003 | Doerfel ................ | G02B 6/0043 348/51 |
| 2005/0063029 A1* | 3/2005 | Khazova ............ | G02B 27/2214 359/3 |
| 2008/0231547 A1 | 9/2008 | Yagiura et al. | |
| 2009/0128900 A1* | 5/2009 | Grasnick ............ | H04N 13/0409 359/462 |
| 2010/0118045 A1* | 5/2010 | Brown Elliott .... | G02B 27/2214 345/589 |
| 2010/0265577 A1 | 10/2010 | Kim et al. | |
| 2011/0210964 A1* | 9/2011 | Chiu ...................... | G09G 3/001 345/419 |

* cited by examiner

AUTOSTEREOSCOPIC SCREEN AND METHOD FOR REPRODUCING IMAGE INFORMATION

PRIORITY CLAIM TO RELATED APPLICATIONS

This application is a national stage application under 35 U.S.C. §371 of PCT/EP2012/000744, filed Feb. 6, 2012, and published as WO 2012/152346 A1 on Nov. 15, 2012, which claims priority to German Application No. 10 2011 101 440.7, filed May 12, 2011, which applications and publication are incorporated by reference as if reproduced herein and made a part hereof in their entirety, and the benefit of priority of each of which is claimed herein.

TECHNICAL FIELD

The invention relates to an autostereoscopic screen for the simultaneous reproduction of a plurality of at least two different images, in a manner such that each of these images is visible from at least one of different viewing zones which are laterally offset relative to one another in front of the screen, according to the preamble of the main claim. The invention further relates to a method for reproducing image information by way of the simultaneous display of a plurality of at least two different images on a corresponding autostereoscopic screen, according to the preamble of the auxiliary claim.

BACKGROUND

A screen of the known type comprises a subpixel matrix with a multitude of subpixels and an optical element which is arranged in front of or behind the subpixel matrix, as well as a control unit for activating the subpixel matrix. The control unit of such a screen is configured to define a number of subsets of pixels which corresponds to the mentioned plurality, on the subpixel matrix, such that each of the subsets forms a family of parallel strips and is assigned to at least one of the viewing zones which by way of this is unambiguously assigned to this subset, wherein the strips of the different subsets cyclically alternate, and to activate the subpixels of the subpixel matrix in dependence on the image data of the images, such that each of the images is reproduced by the subpixels of one of the mentioned subsets. The optical element of such a screen may e.g. be given by a parallax barrier or by way of a lenticular lens, and has a corresponding grating-like structure aligned to the strips, in order to lead light departing from the subpixels of each of the subsets, into the viewing zone assigned to this subset.

As long as two eyes of a viewer are located in two different ones of the viewing zones, this viewer may thereby be shown a three-dimensionally appearing stereo image by way of the images reproduced on the different subsets of subpixels being selected as stereoscopic half-images which are complementary to one another.

Screens of this type are known from the state of the art, wherein one may differentiate between so-called single-user displays and multi-user displays, depending on the number of subsets and accordingly on the number of images which are to be simultaneously reproduced. A single-user display for the simultaneous reproduction of two stereoscopic half-images is known for example from the document DE 10 2006 031 799 B3. There, it is also described how an activation of the screen by way of so-called tracking can be adapted to a changing head position of a viewer by way of brightness centres of gravity of pixels which each comprise several subpixels, being laterally displaced by way of a different weighting of intensities of the different subpixels of each pixel.

However, it has been found that with this and with other known methods of activating autostereoscopic screens, strip patterns which are annoying to the viewer depending on his exact head position, may remain visible on the screen and are superimposed on the reproduced images and are typically orientated parallel to the structure of the optical element. Even with slight head movements, these strip patterns may shift greatly and then appear extremely annoying, even if they result by way of slight apparent brightness fluctuations.

OVERVIEW

It is therefore the object of the invention to suggest an autostereoscopic screen and a corresponding method for reproducing image information on an autostereoscopic screen, with which annoying artifacts of this type can be avoided. The viewer of the screen should therefore be able to view the images reproduced on the screen with as little disturbance as possible.

According to the invention, this object is achieved by a screen with the characterising features of the main claim in combination with the features of the preamble of the main claim as well as by a method with the features of the auxiliary claim.

The control unit, with the suggested screen, is thus configured to define the subsets of subpixels, on which the individual images are to be represented, such that of the strips of at least two of the subsets, directly adjacent strips overlap such that subpixels from an intersection of these two subsets form a band of a width of at least one subpixel, along an edging of two of the strips, and activate the subpixels within this intersection in each case with an averaged intensity value which results as an average between a first intensity value and a second intensity value, wherein the first intensity value is defined by the image data of the image reproduced on a first of these subsets, whilst the second intensity value is defined by the image data of the image represented on a second of these subsets.

As has been found, the annoying strip patterns described above are avoided by way of this. The strip patterns which are observed with the state of the art are specifically artefacts which are caused by the optical element with the grating-like structure and originate from the fact that due to the finite extension of the subpixels, deviations—with the given structure of the optical element—between a numerically optimal location of an image point on the subpixel matrix and an image point which is actually reproducible there by a subpixel or a subpixel group, may not be avoided—even by way of very accurate tracking. Disturbing influences of these deviations, as has now been ascertained, may now be practically completely compensated by the activation of the subpixels within the mentioned intersections, with the intensity values which are averaged in the described manner.

The suggested method is accordingly also advantageous, since for the same reasons, it prevents annoying artefacts in the reproduced images and therefore entails a high image quality. With this method for reproducing image information by way of the simultaneous display of a plurality of at least two different images on an autostereoscopic screen, each of the images is visible from at least one of different viewing zones which are laterally offset relative to one another. With this, a subpixel matrix of the screen with a multitude of subpixels is activated in dependence on image data of the images, in a manner such that a number of subsets of subpixels which corresponds to the mentioned plurality, is defined on the subpixel matrix, and that each of the images is represented by the subpixels of one of these subsets of subpixels, whereby the subsets are defined such that each of the subsets forms a family of parallel strips and is assigned to at least one of the viewing zones which by way of this is unambiguously assigned to this subset, wherein the strips of the different subsets cyclically alternate. Light coming from the subpixels of each of these subsets is led through a grating-like structure, aligned according to the strips, of an optical element of the screen which is arranged in front of or behind the subpixel matrix, into the viewing zone assigned to this subset. Thereby, for overcoming the outlined problems, the subsets are defined such that of the strips of at least two of the subsets, directly adjacent strips overlap such that subpixels from an intersection of these two subsets form a band of a width of at least one subpixel, along an edging of two of the strips, wherein the subpixels within this intersection in each case are activated with an averaged intensity value which results as an average between a first intensity value and a second intensity value, wherein the first intensity value is defined by the image data of the image reproduced on a first of these subsets, whilst the second intensity value is defined by the image data of the image represented on a second of these subsets.

The subpixel matrix of the screen may e.g. by given by a LCD. The subpixels may be arranged in lines and columns, wherein typically subpixels of three basic colours red, yellow and blue alternate in a cyclical sequence in each line. By way of a suitable arrangement of the subpixels in the consecutive lines, with this, without any problem, one may succeed in image points being reproduced in the correct colour by a subpixel group, independently of its lateral extension and position, when the subpixel group extends in the column direction over three lines. Instead of an LCD, one may also apply other arrangements as a subpixel matrix, e.g. a plane direct-view display panel or a direction-selective projection device, in which several—at least two—projection images are superimposed such that the described subsets result.

With typical embodiments, the optical element is given by a parallax barrier or by a lenticular lens. The grating-like structure may thus e.g. be realised by a family of parallel and typically equidistant cylinder lenses or slots.

One may envisage intensity values for the subpixels being deduced or computed from the image data of each of the images as a function of location coordinates of the subpixels. The averaged intensity value may then be determined for each of the subpixels from the mentioned intersection, by way of the first intensity value being selected as the intensity value defined by the image data of the image reproduced from the first subset, for the location coordinates of this subpixel, whilst the second intensity value is selected as the intensity value defined by the image data of the image reproduced on the second subset, for the location coordinates of this subpixel.

Of course, it is possible for the images to be defined with a resolution which is smaller than a maximal possible spatial resolution which is theoretically obtainable with the given subpixel matrix. In this case, in particular, the intensity values for the subpixels may be deduced or computed also as a function of location coordinates of pixels which are each formed by several of the subpixels, from the image data of each of the images.

Accordingly, it is also possible for the averaged intensity value to be determined for each of the subpixels from the intersection, by way of the first intensity value being selected as the intensity value which is defined by the image data of the image reproduced on the first subset, for the location coordinates of the pixel containing these subpixels, whilst the second intensity value is selected as the intensity value which is defined by the image data of the image represented on the second subset, for the location coordinates of the pixel containing these subpixels.

The control unit therefore—typically by way of a suitable programming—can be configured to deduce or compute intensity values for the subpixels as a function of location coordinates of the subpixels or of location coordinates of pixels formed by several of the subpixels in each case, from the image data of each of the images, and for each of the subpixels from the intersection, to determine the averaged intensity values by way of the first intensity value being selected as the intensity value defined by the image data of the image reproduced on the first subset, for the location coordinates of this subpixel or the pixel containing these subpixel, whilst the second intensity value is selected as the intensity value defined by the image data of the image represented on the second subset, for the location coordinates of this subpixel or of the pixel containing these subpixels.

The described method and the described configuration of the control unit, with regard to programming technology, may be advantageously applied with very different screens. In particular, with regard to the screen, it may be the case of a multi-view display or a single-user display. Typically, the plurality of images and subsets which is mentioned above will be two in each case, as is usually the case with a single-user screen. The same measures may however also be applied to cases, with which more than two images are simultaneously reproduced and the number of subsets of subpixels is accordingly larger that two. Finally, the suggested measures may also be realised if a screen which is initially envisaged as a multi-user display for representing a multitude of more than two stereoscopic half-images which are in each case complementary to one another, is used for another purpose. Such a screen, e.g. by way of an activation which is different from the initially specification and by way of an accordingly different grouping of the subpixels into image points, may be used for representing a reduced number of half-images—for example in a single-user mode—and/or even for the simultaneous representation of different scenes for different viewers placed in front of the screen.

The described advantage of an improved image quality by way of eliminated annoying artefacts is particularly pronounced, if the simultaneously shown images are stereoscopic half-images which are complementary to one another, thus the screen is indeed used as an autostereoscopic screen. In typically cases of application, the subpixels thereby are divided onto exactly two subsets and accordingly two half-images are shown simultaneously.

Although it is not ruled out that the initially described problems only occur in certain regions of the screen due to geometry, and the subpixel matrix is accordingly activated not over the whole surface, but only in the described manner at locations, however usually the subsets are defined such that with the exception at the most of a strip lying to the very outside, all strips at least one of the subsets, in each case at at least one edge, comprise a band of subpixels which belong to the intersection, wherein as a rule—if also not necessary—all subpixels within the intersection are activated with intensity values averaged in the described manner. The intersection is then formed by a family of parallel bands of subpixels, wherein in the most typical case of only two subsets, each pair of directly adjacent strips of the subsets forms one of the bands of this intersection, where these strips overlap.

It is useful if the averaged intensity value is determined by way of addition of the first intensity value which is multiplied by a first weighting factor and of the second intensity value which is multiplied by a second weighting factor, wherein the first weighting factor and the second weighting factor depend on a displacement value. Thus one may achieve good results in a simple manner. In particular, the control unit may be configured to determine the respective averaged intensity value in this manner, with little effort with regard to programming technology, Thereby, the displacement value under certain circumstances can be defined in a location-dependent manner, thus in a manner dependent on the location coordinates of the respective subpixel or on the location coordinates of the pixel containing these subpixels.

Preferably, the two weighting factors should assume values between zero and one and be defined such that the first weighting factor monotonously decreases with an increasing displacement value, and the second weighting factor monotonously increases with an increasing displacement value, or that the first weighting factor monotonously increases with an increasing displacement value and the second weighting factor monotonously decreases with an increasing displacement value.

The initially outlined, annoying appearances on the screen may be eliminated particularly well, independently of how the weighting factors are precisely determined, if the weighting factors are defined in each case such that a sum of the first weighting factor and the second weighting factor in each case is one.

Since the disturbing patterns which a viewer perceives on the screen with a conventional activation of autostereoscopic screens and which are prevented with the measures suggested here, depend on the head position—or more precisely, on eye positions—of the viewer, the suggested measures are particularly advantageous if they are combined with a so-called tracking. Preferably, with the method, thus one moreover detects a head position or eye positions of at least one viewer, wherein the averaged intensity value is determined in each case in a manner depending on the detected head position or the detected eye positions. This e.g. may be effected by way of the previously mentioned displacement value being determined in dependence on the detected head position or the detected eye positions. Accordingly, it is advantageous if the described screen also has a tracking device for detecting a head position or eye positions of at least one viewer, and if the control unit or evaluation electronics are set up to determine the displacement value in dependence on an exit signal of the tracking device or a detector of the tracking device. The tracking device or the detector of the tracking device can be realised e.g. by a stereo camera which monitors a space in front of the screen and is connected to the control unit, wherein the images of this stereo camera may be evaluated by image recognition software.

It is particularly useful if the variable displacement value is defined as follows. One determines two nominal positions for two images points which are directly adjacent in the lateral direction and are typical formed in each case of several subpixels. The subpixels which form these two image points, below to two different ones of the mentioned subsets. The displacement value for the subpixel or subpixels lying centrally between the two nominal positions, from the intersection of these two subsets, may then be defined as a measure for a lateral displacement of a point lying precisely centrally between the two nominal positions. The displacement can thereby be defined e.g. departing from an initial position which corresponds to the nominal positions of the two image points with an ideal position of the viewer, thus at eye positions which are optimal for the screen. Again, the positions on the subpixel matrix, in which with given geometric constraints, the pixels or centroids of an area or brightness centres of gravity of the pixels of the respectively reproduced image would have to lie, in order to permit an optimal image quality, are indicated as the nominal positions of the image points. The geometric constraints thereby result due to the eye positions and the geometric characteristics of the screen, in particular the structure of the optical element and a distance between the optical elements and the subpixel matrix.

BRIEF DESCRIPTION OF THE DRAWINGS

Embodiments of the invention are hereinafter explained by way of the FIGS. 1 to 9. There are shown in.

DETAILED DESCRIPTION

Figure 1:
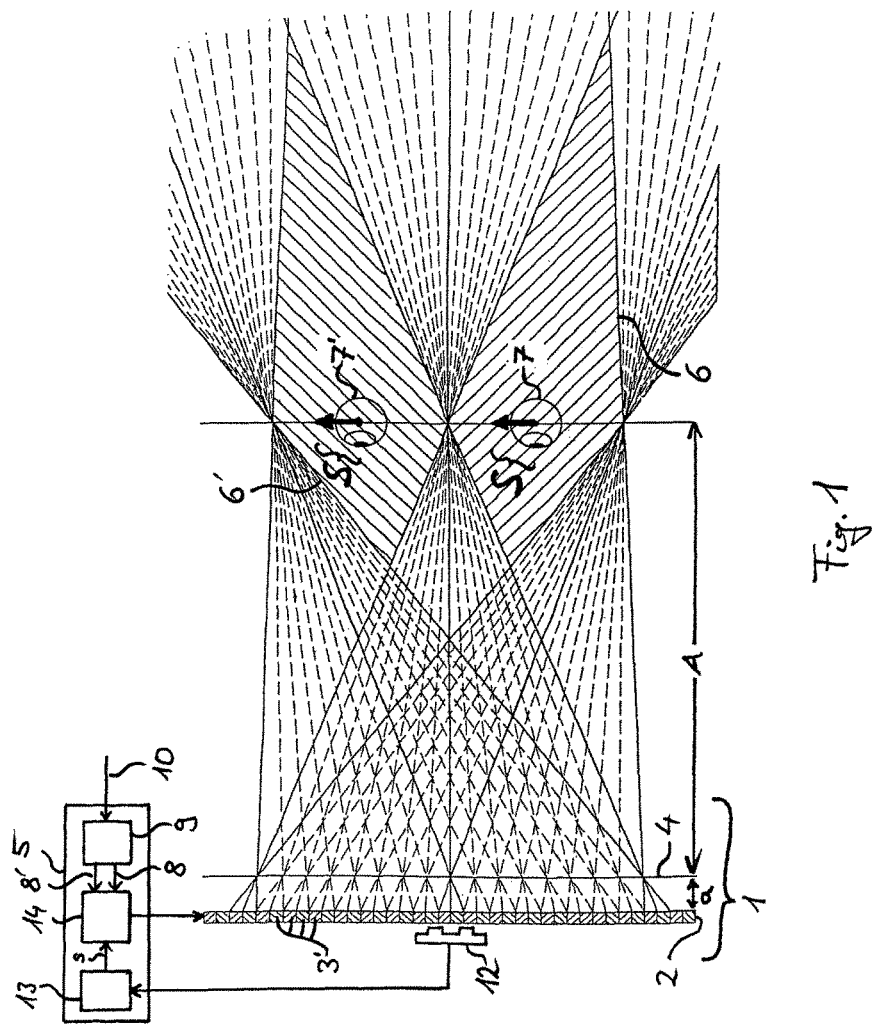
FIG. 1 in a schematic representation, a plan view on an autostereoscopic screen and a space with two viewing zones in front of this screen, FIG. 2 a detail of a subpixel matrix of the screen of FIG. 1, FIG. 3 a front view of an optical element which is arranged in front of the subpixel matrix, in one embodiment of this screen, in which the optical element is given by a parallax barrier, FIG. 4 a cross section through a part of the subpixel matrix and of the optical element which is arranged in front, in another embodiment of the screen, in which the optical element is given by a lenticular lens, FIG. 5 a schematic representation which illustrates how image data of two stereoscopic half-images are written into the subpixel matrix of the screen, FIG. 6 a diagram, which with the example of one of several subpixel lines of the detail of the subpixel matrix, which is shown in the FIGS. 2 and 5, shows further details of the way and manner as to how the image data of the two stereoscopic half-images are written into the subpixel matrix, FIG. 7 a representation corresponding to FIG. 6, for a modified embodiment of the screen, in which the subpixel matrix is activated in a slightly different manner, FIG. 8 a representation corresponding to FIG. 5, for a case in which the image data of both stereoscopic half-images are written into the subpixel matrix in another manner, and FIG. 9 a representation according to the FIGS. 5 and 8, for the case in which the two stereoscopic half-images are defined with a lower resolution.

The autostereoscopic screen represented in FIG. 1 comprises a subpixel matrix 2, given by an LCD, with a multitude of subpixel groups 3', an optical element 4 arranged in front of the subpixel matrix 2 as well as a control unit 5 for activating the subpixel matrix 2. The subpixel groups 3', of which each forms an image point, each comprise several subpixels 3 which here are not shown individually and which are distributed over the subpixel matrix 2 in a manner shown in FIG. 2. Two different images may be reproduced simultaneously with the screen 1, in a manner such that one of these images is visible from a left viewing zone 6 and the other of these images from a right viewing zone 6, in front of the screen 1. In a typical case of application, one would select the two images as stereoscopic half-images which are complementary to one another, so that a viewer who is placed such that a left eye 7 of the viewer is located in the left viewing zone 6 and a right eye 7' of the viewer is located in the right viewing zone 6', may autostereoscopically, i.e. with a depth effect, perceive a stereo image composed of the two stereoscopic half-images.

With the help of the suitably programmed control unit 5, the subpixel matrix 2 is activated for this such that two different subsets of pixels 3 are defined on the subpixel matrix 2, such that each of the subsets form a family of strips which run parallel to a grating-like structure of the optical element 4, wherein the strips of the two subsets on the subpixel matrix alternate from the left to the right. Thereby, each of the two viewing zones 6 and 6' is unambiguously assigned to one of these two subsets of subpixels 3, by way of the light departing from the subpixels 3 of this subset being led through the grating-like structure of the optical element 4 at least mainly into this viewing zone 6 and 6' which is assigned to this subset. The control unit 5 is moreover configured to activate the subpixels 3 of the subpixel matrix 2 in dependence on image data of the left stereoscopic half-image and on image data 8' of the right stereoscopic half-image, such that each of these half-images is represented on one of the two mentioned subsets of subpixels 3, and specifically such that the left eye 7 from the left viewing zone 6 may see left stereoscopic half-image, whilst the right stereoscopic half-image is visible to the right eye 7' from the right viewing zone 6'. For this, the image data 8 and 8' can be e.g. read out of a data carrier or be computed from abstract image information 10 by way of a renderer 9.

Figure 2:
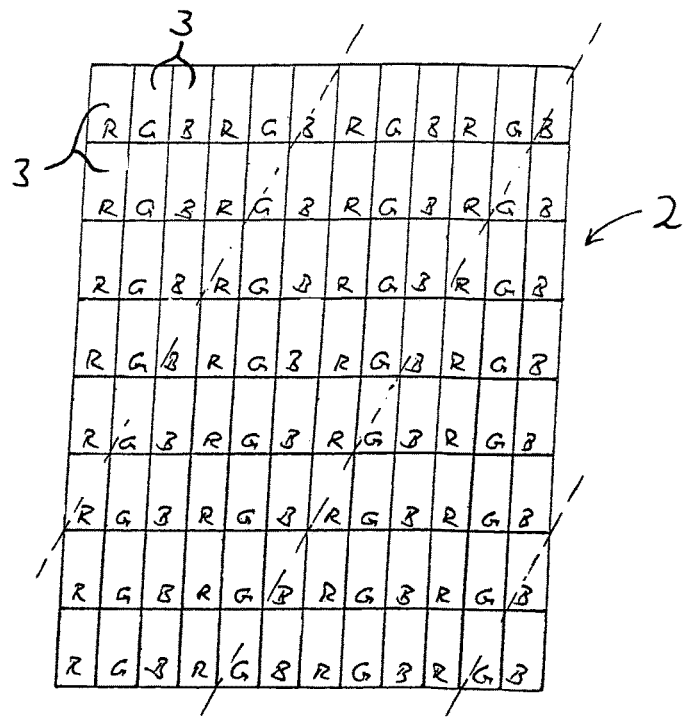

FIG. 2 shows a detail of the subpixel matrix 2. The subpixels 3 are arranged in lines and columns, wherein columns of red, green and blue subpixels 3 which in FIG. 2 are characterised corresponding to their colour by one of the letters R for red, G for green and B for blue, alternate in a cyclical sequence. The grating-like structure of the optical element 4 arranged in front of the subpixel matrix 2 is indicated in FIG. 2 only by way of dashed lines.

Figure 3:
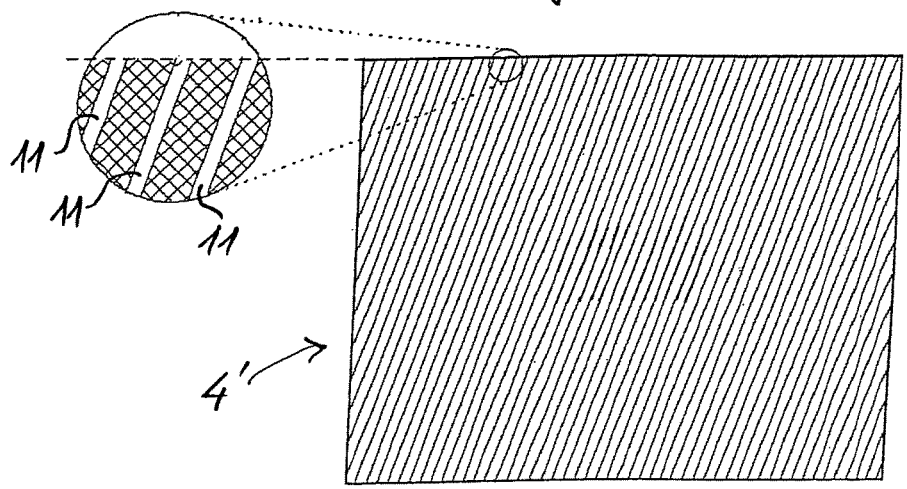

The optical element 4 may e.g. be given by a parallax barrier 4' represented in FIG. 3. The parallax barrier 4' may e.g. be realised by a glass plate which is covered at locations with an opaque coating, wherein the coating forms equidistant parallel walls, between which slots 11 remain free, which form the structure of the optical element 4. Some of these slots 11 are represented in an enlarged manner in FIG. 3.

Figure 4:
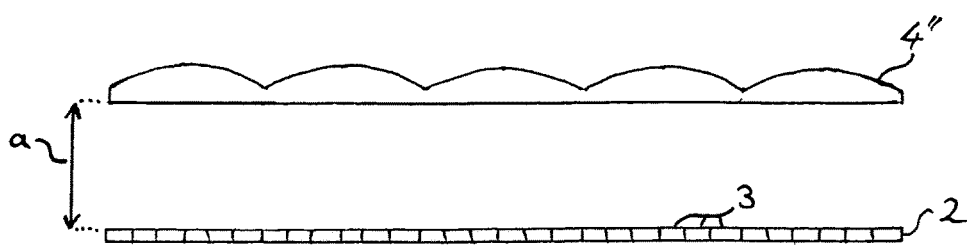

In another embodiment of the screen 1, the optical element is given by a lenticular lens 4" which is arranged in front of the subpixel matrix 2. A cross section through a part of this lenticular lens 4" and a corresponding detail of the subpixel matrix 2 are represented in FIG. 4. Recurring features here as well as in the following figures are again provided with the same reference numerals. The lenticular lens 4" is given by a family of parallel cylinder lenses which in this case form the grating-like structure of the optical element 4 and lead the light departing from the subpixels 3 into the different viewing zones 6 or 6', depending on the exact position of these subpixels.

The cylinder lenses may be formed or shaped such that their focal widths are just as large as the distance a between the lenticular lens 4" and the subpixel matrix 2. In this case, the lenticular lens 4" with respect to its function of guiding the light departing from the subpixels 3 of the different subsets into the different viewing zones 6, 6', has characteristics which chiefly correspond to the parallax barrier 4' from FIG. 3. However, designs are possible, with which the focal width of the cylinder lenses is shorter or longer than a, so that the cylinder lenses image the subpixels 3 into an image plane lying in front of the lenticular lens 4" or act in a magnifying manner and produce virtual images of the subpixels 3 behind the plane defined by the subpixel matrix 2. The invention explained here by way of embodiment examples is independent of the specific design and may be applied to all conceivable solutions.

Of course, the optical element 4 with other embodiments of the screen 1 may also be designed differently. Thus e.g. it is possible for the optical element not to be arranged in front, but behind the subpixel matrix 2 and to separate this from a light source of the screen 1.

In the embodiment example described here, the screen 1 also comprises a tracking device for detecting a head position or two eye positions of the viewer, wherein the tracking device comprises a stereo camera directed onto a space in front of the screen 1 and in particular viewing over the viewing zones 6 and 6', as well as evaluation electronics 13 contained in the control unit 5. The evaluation electronics 13 connected to the stereo camera 12 evaluate images taken by the stereo camera 12 with the help of image recognition software and in dependence on the head position detected by way of this, or the eye positions detected by way of this, determines a displacement value s. In the situation represented in FIG. 1, in which the eyes 7 and 7' of the viewer are located at a distance A in front of the screen 1, which corresponds to a nominal distance for this screen 1, the displacement value s is related to a lateral displacement S of the head position or the eye positions of the viewer according to the relationship $s=a\times S/A$, where a indicates a distance between the subpixel matrix 2 and the optical element 4. With differently mentioned embodiments of the screen 1 or with different positioning of the viewer or also of several viewers, the displacement value s may however also be differently determined and under certain circumstances may also be location-dependent, thus assume different values for different locations on the subpixel matrix 2. Thereby, the variable displacement value s may in particular be defined by way of firstly—by way of evaluating the head position or the eye positions of the viewer with the evaluation unit 13—determining two nominal positions for two image points which are directly adjacent in the lateral direction and which are formed in each case of several subpixels. These nominal positions are thereby defined such that they lie exactly centrally between lateral delimitations of the coherent sections of the subpixel matrix 2 which the viewer can see through the grating-like structure of the optical element 4 in each case with one of his eyes 7 or 7'. The displacement value s for the subpixel or subpixels 3 lying centrally between the two nominal positions, from the intersection of the two subsets, may be defined as a measure for a lateral displacement of a point lying exactly centrally between the two nominal positions. The displacement may thereby e.g. be defined proceeding from an initial position which corresponds to the nominal positions of the two image points with an ideal position of the viewer. This ideal position corresponds typically to a middle placement of the observer as a distance A in front of the screen, if A is the nominal distance for this screen. With this, as a rule, this is based on an eye distance of 65 mm between the eye positions 7 and 7'.

Apart from the renderer 9 and the evaluation electronics 13, the control unit 5 of the screen 1 finally comprises a so-called synthesiser 14 which defines the two subsets of pixels in dependence on the displacement value s and activates the subpixels 3 of the subpixel matrix 2 accordingly in dependence on the displacement value s as well as the image data 8 and 8'. This is effected in a manner which is described in more detail hereinafter.

Figure 5:
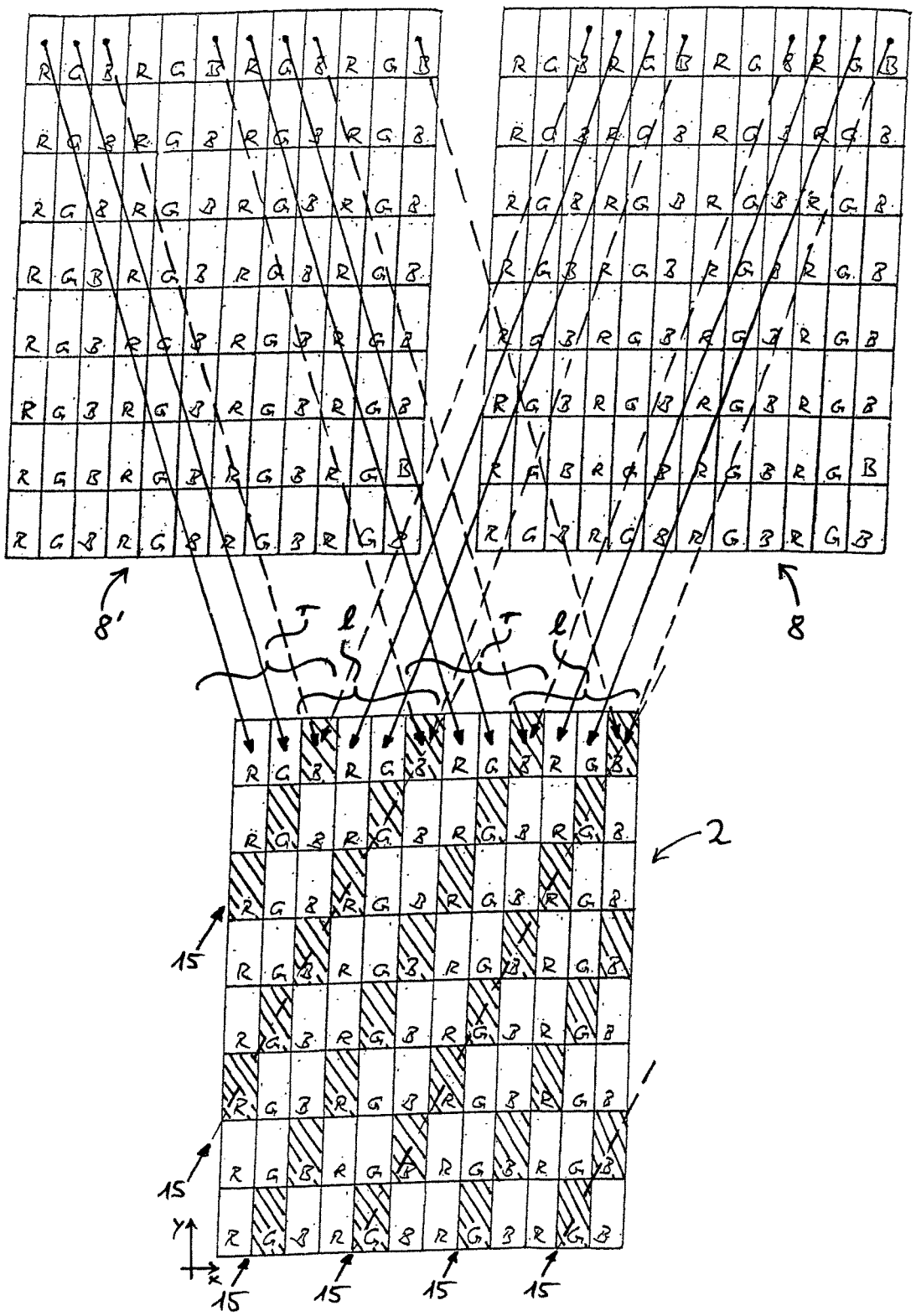

Apart from the detail of the subpixel matrix 2 already represented in FIG. 2, parts of the image data 8 and 8' of the left and right stereoscopic half-image which correspond to this detail are illustrated in FIG. 5. The image data 8 and 8' in each case for each of the subpixels 3 defines an intensity value, wherein this intensity value may be expressed as a function of location coordinates (x, y) of the respective subpixel 3 on the subpixel matrix 2. The image data 8 and 8' may thereby be defined such that the intensity values may be read out directly from this image data 8 and 8', or such that the control unit 5 may at least compute the intensity values from this image data 8 and 8'. In the representation of the image data 8 and 8' selected in FIG. 5, the intensity value defined for each subpixels 3 reproduced in FIG. 5 is illustrated in each case by a correspondingly arranged field of matrix, wherein the image data 8 of the left stereoscopic half-image here is shown on the right and the image data 8' of the right stereoscopic half-image here is shown on the left in the image. The term intensity value here in each case indicates a brightness or a brightness value, with which one of the subpixels 3 is to be activated. Now, some of the subpixels 3, in a manner which is explained hereinafter in more detail, are not activated with the intensity values which are directly read out or computed from the image data 8 and 8', but with averaged intensity values.

A first of the two subsets, to which the left viewing zone 6 is assigned, is formed by strips of subpixels which are indicated in FIG. 5 with the letter f and which are tilted to the right out of the vertical by an angle of approximately 19°. They thus run in each case from the top right to the bottom left obliquely over the subpixel matrix 2. The respective strips of subpixels 3 of the second subset, to which the right viewing zone 6' is assigned, said strips arranged between these strips, are indicated in FIG. 5 with the letter r. The two subsets are now defined such that of the strips of the two subsets, in each case the directly adjacent strips overlap, so that the subpixels 3 from an intersection of both subsets form a band 15 of a width of one subpixel 3 in the present case, in each case along an edging of two of the strips. Subpixels 3 belonging to this intersection are represented in a hatched manner in FIG. 5. Each of the mentioned strips of subpixels 3 with the exception of two strips lying at the very outside therefore each comprise two of the mentioned bands 15 of subpixels 3 which belong to the intersection, and specifically such a band 15 in each case along each of two edges of the respective strips. Since the bands 15 as also the strips themselves and the structure of the optical element 4 aligned parallel thereto, run obliquely with respect to the columns of the subpixel matrix 2, thus with the gaps enclose a non-infinitesimal angle, the bands 15 of course become shorter towards lateral delimitations or borders of the subpixel matrix 2, so that a band 15 lying at the very outside may theoretically have a length of only one subpixel 3. The same applies to the strips of subpixels, of which a strip lying to the very left and a strip lying to the very right have a correspondingly short band 15 of subpixels 3 from the intersection, of course only along one edge.

The synthesiser 14 is now programmed such that the subpixels 3 within the intersection of the two subsets and which are represented in a hatched manner in FIG. 5, are activated in each case with an averaged intensity value which results as an average between a first intensity value and a second intensity value, wherein the first intensity value is defined by the image data 8 of the left half-image reproduced from the first subset, whilst the second intensity value is defined by the image data 8' of the right half-image reproduced on the second subset. In contrast, the subpixels 3 which only belong to the first subset are activated with the intensity values which are defined by the image data 8 of the left half-image, whilst the subpixels 3 belonging exclusively to the second subset are activated with the intensity values which are defined by the image data 8' of the right half-image. Thus the intensity value defined by the respective image data 8 and 8' is simply written in each case into the subpixels which belong in each case to only one of the two subsets, which in FIG. 5 with the example of the first subpixel line reproduced there, is illustrated by unbroken arrows. In contrast, with the activation of the subpixels 3 falling in one of the bands 15, an averaging of two intensity values is effected in each case, of which one is taken from the image data 8 and the other from the image data 8', which is illustrated in each case by dashed arrows for the first subpixel line in FIG. 5. As FIG. 5 illustrates, the averaged intensity value is therefore determined for each of the subpixels 3 from the intersection of the two subsets, by way of the first intensity value being selected as the intensity value defined by the image data 8 of the left stereoscopic half-image, for the location coordinates of this subpixel 3, whilst the second intensity value is selected as the intensity value defined by the image data 8' of the right half-image, for the location coordinates of this subpixel.

Thereby, the averaged intensity value for the respective subpixel 3 is determined by way of addition of the first intensity value multiplied by a first weighting factor, and of the second intensity value multiplied by a second weighting factor, wherein the two weighting factors depend on the previously mentioned displacement value s. The two weighting factors thereby in each assume values between 0 and 1 and add up to 1, wherein the first weighting factor monotonously reduces with an increasing displacement value s and the second weighting factor monotonously increases with an increasing displacement value s, or vice versa.

Figure 6:
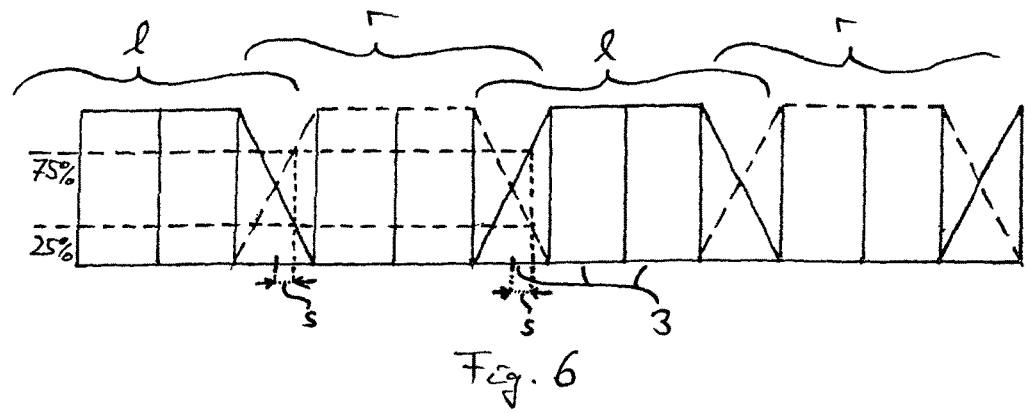

FIG. 6 illustrates the activation of the subpixels 3 from a line of the subpixel matrix 2 and the dependence of the two weighting factors on the displacement value s for the simplest case, in which the weighting factors may be expressed in each case as a linear function of the displacement value s. For four subpixels 3 from the intersection, which in each case are separated from one another by two subpixels 3 belonging to only one of the subsets, the first weighting factor is represented in FIG. 6 each by an unbroken line and the second weighting factor in each case by a dashed line. In the representation selected here, moreover a first and a second weighting factor is defined in each case also for the remaining subpixels 3 and illustrated by corresponding sections of the same unbroken and dashed lines, wherein the first weighting factor is defined with the value 1 and the second weighting factor with the value 0 for the subpixels 3 belonging exclusively to the first subset, whilst the second weighting factor is defined as 1 and the first weighting factor as 0 for the subpixels 3 belonging exclusively to the second subset. The zero point of the displacement value s may of course also be defined in a different manner to that which is represented here. Here, a definition is selected, with which the two weighting factors in each case have a value 0.5 for a displacement value s=0, so that the averaged intensity value with a displacement value of s=0 results as an arithmetic mean between the two intensity values defined by the image data 8 and 8'.

A different displacement value s=b/4 is drawn in FIG. 6 by way of example and corresponds to a movement of the eyes 7 and 7' by the displacement S=(b·A)/(4·a) to the right, wherein b is to indicate the width of an individual subpixel 3 or the distance of centroids of areas of subpixels 3 laterally bordering one another. For this displacement value s, for a subpixel 3 from the intersection and which lies at the right edge of a strip belonging to the first subset and at the left edge of a strip of subpixels 3 which belongs to the second subset, the first weighting factor will assume a value of 0.75, whilst the second weighting factor for this subpixel 3 then has a value of 0.25. Reversely, with this displacement value s for subpixels 3 from the intersection which lie at the left edge of a strip belonging to the first subset and at the right edge of a strip of subpixels 3 belonging to the second subset, it is the case that the first weighting factor assumes a value of 0.25 whilst the second weighting factor for these subpixels 3 has a value of 0.75. The dependence of the weighting factors on the displacement value s thus results in a change of the activation of the subpixels 3, which corresponds to a lateral displacement of intensity centres of gravity of pixels composed in each case of several subpixels 3. Thereby, the suggested activation of the subpixels 3 from the intersection results in the position of the intensity centres of gravity of the pixels being adapted as well as possible to the position of the eyes 7 and 7' of the viewer and annoying appearances on the screen being simultaneously avoided, which would be caused by subpixels between adjacent image points which are darkly scanned or activated with too little intensity.

Figure 7:
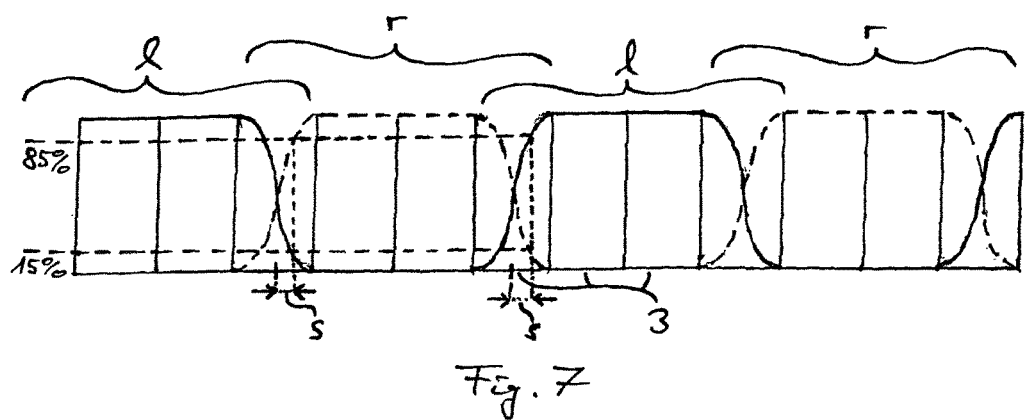

FIG. 7 shows a representation according to FIG. 6, for the case of a slightly different definition of the weighting factors, with which these are no longer dependent on the displacement value s in a linear manner, so that the weighting factors e.g. for the magnitude of the displacement value s drawn in the FIGS. 6 and 7 by way of example, are no longer 0.75 and 0.25 but 0.85 and 0.15.

Figure 8:
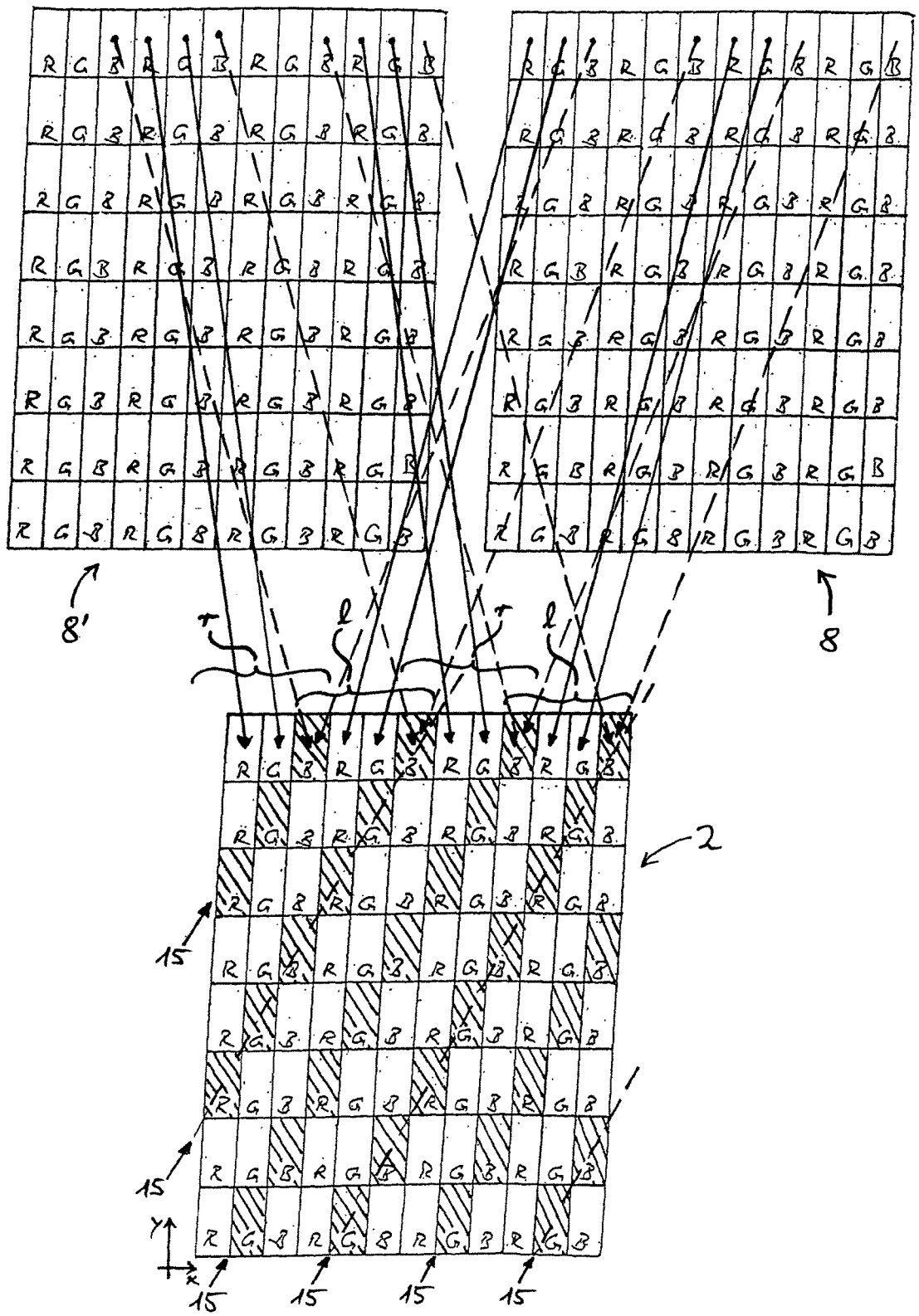

The previously described FIG. 5, by way of a special case, has illustrated how the image data 8 and 8' may be written into the subpixel matrix by way of the control unit 5 suitably activating the subpixels 3 with the synthesiser 14. A certain interleaving pattern of intensity values corresponding to the image data 8 and 8' results from the two half-images by way of this, so that these half-images are reproduced on the subpixel matrix 2 in a manner in which they are interleaved. It is to be noted that other interleaving patterns may also be applied for this. Another example is shown in FIG. 8, which corresponds to the manner of the representation of FIG. 5. The embodiment illustrated by way of FIG. 8 differs from the embodiment of FIG. 5 only by way of the fact that intensity values assigned to slightly different location coordinates are read out of the image data 8 and 8' and written into the subpixel matrix 2, thus reproduced on the subpixels 3, The addresses or location coordinates (x, y), at which an intensity value is reproduced in this case by way of a suitable activation of the subpixel 3 placed there, thus here does not correspond exactly to the address or the location coordinates (x, y) in the original stereoscopic half-image. The image quality under certain circumstances may be improved by such or similar readdressing, depending on which imaging characteristics the optical element 4 serving for the separation of the half-images has. In particular, it is possible for irregularities which are caused by crosstalk between adjacent canals, to thus be able to be smoothed.

Figure 9:
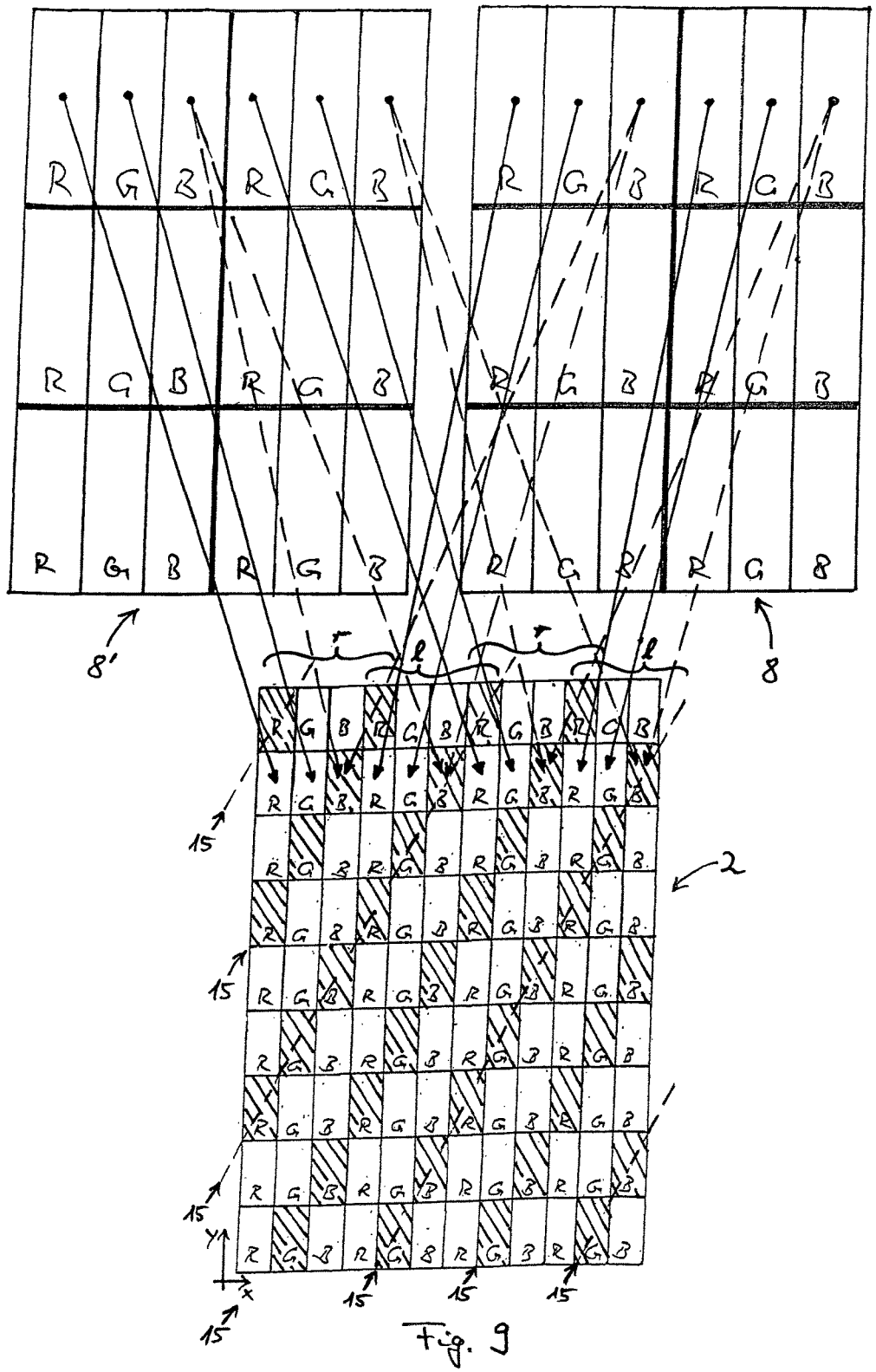

FIG. 9 shows a representation corresponding to the FIGS. 5 and 8, in a case, in which the image data 8 and 8' of each of the two half-images no longer define an individual intensity value for each subpixel, 3 but merely in each case an intensity value for each of the three basic colours red, green and blue per pixel, wherein the pixels comprise several subpixels and in the present case correspond in each case to an area of 18 subpixels. In this case, intensity values for the subpixels 3 as a function of location coordinates (x, y) of pixels each formed by way of several of the subpixels 3, are deduced or computed from the image data 8 and 8' of each of the two half-images, wherein now the averaged intensity value for each of the subpixels is determined in each cases by way of selecting the first intensity value as the intensity value defined by the image data 8 of the left half-image for the location coordinates (x, y) of the pixel containing these subpixels 3, whilst the second intensity value is selected as the intensity value defined by the image data 8' of the right half-image for the location coordinates (x, y) of the pixel containing these subpixels 3. The way and manner of writing intensity values out of the image data 8 and 8' into the subpixels 3 of the subpixel matrix 2 is thereby illustrated in FIG. 9 again by arrows for one of the subpixel lines. As FIG. 9 shows, with this embodiment example, each of the intensity values deduced or computed from the image data 8 and 8' is not only used for the activation of exactly one of the subpixels 3, but in each case for several of the subpixels 3, but with different weightings, depending on whether it is the case of a subpixel 3 from the intersection or of a subpixel which belongs only to one of the two subsets. This type of activation of the subpixel matrix 2 lends itself particularly in cases, in which the images or half-images to be reproduced are defined with a lower spatial resolution than the resolution which may be theoretically realised with the subpixel matrix 2.

The averaged intensity values, with which the subpixels 3 are activated within the intersection, may also be determined depending on an image content of the two images reproduced on the overlapping subsets, for example by way of a component which is dependent on the image content and is typically location-dependent, flowing into the displacement value 2. In particular, the control unit 5—or more precisely the component of the control unit 5 which is here indicated as a synthesiser 14—may be configured to determine correction values from the image data via one or more filter functions, depending on a difference between intensity values for subpixels 3 of the same colour which lie closest to one another in the line direction and are from the overlapping subsets, and to determine the averaged intensity values, with which the subpixels 3 are activated within the mentioned intersection, depending on these correction values. With regard to the mentioned filter functions, it may e.g. be the case of a crosstalk compensation or an edge filter. In particular, with regard to the correction values it may be the case of (not identical to the mentioned difference) crosstalk compensation values which when determining the averaged intensity values, are admixed or subtracted.

Yet further possibilities are considered for determining the averaged intensity values and accordingly other possibilities of activating the subpixels 3 within the intersection by way of a suitable programming of the control unit 5. The averaged intensity values may e.g. be determined by way of firstly computing an intermediate image with a projection centre between the right and the left camera position or eye position, depending on the images reproduced on the subsets—thus depending on the right and left stereoscopic half-image, which correspond to a perspective of a (actual or imagined) right camera position or eye position and from a perspective of a (actual or imagined) left camera position or eye position. The computed intermediate image thus corresponds to a perspective of a virtual camera position between the right and the left camera position or eye position (thus between the projection centres of the two stereoscopic half-images supplementing one another into a stereoimage). The averaged intensity values, with which the subpixels 3 are activated within the intersection, then are determined as the intensity values which define the intermediate image or the image data of the intermediate image which is thus computed from the image data 8 and 8', for the location coordinates of the respective subpixels 3. The projection centre of the intermediate image may thereby under certain circumstances also again be determined in a manner depending on the displacement value s which is determined by the tracking device or from the coordinates determined by it, so that the perspective of the intermediate image lies closer to that of the right or closer to that of the left half-image, depending on the value of the displacement value s. Of course with all this, it is sufficient if the image data of the intermediate image is only computed for the subpixels 3 from the intersection. Thereby, e.g. epipolar geometry or a depth card which results from the stereoscopic half-images or is also used for their definition, may be used for computing this image data or the averaged intensity values.

Of course, other modifications of the cases described here are also possible. Thus in particular one may also envisage a suitable activation of the subpixel matrix 2 given a division of the subpixels 3 into a larger number of subsets, if a suitable number of more than two images are to be simultaneously reproduced, of which then each is visible from one of several viewing zones. It is not harmful if the images are additionally visible from further auxiliary zones which lie further to the outside, which can arise by way of light departing from one of the subpixels 3 being able to go through more than one slot 11 of the parallax barrier 4' or through more than one of the cylinder lenses of the lenticular lens 4", into the space in front of the screen 1. In the case of a larger number of subsets and images, the subsets also each form a family of strips which overlap in the edge regions, wherein the subpixels within thus arising intersections of two subsets are activated in the outlined manner with averaged intensity values. With regard to the images, in this case it may also be the case of stereoscopic half-images of a single scene which are complementary to one another. With an adequately high number of subsets and viewing zones, the images may however also reproduce different scenes for different viewers, wherein also again in each case two or more complementary stereoscopic half-images may be represented for one or more of these viewers, wherein these half-images supplement one another into stereoimages with a depth effect for this or these viewers. Explicitly mentioned is also the possibility of the bands 15 which form the intersection between the different subsets of subpixels 3, also being able to be wider than shown in FIG. 5. Thus a few or all of these bands 15 may also e.g. each have a width of two subpixels 3, thus each have two adjacent subpixels 3 in one line.

Finally, it is to be noted that the synthesiser 14 does not need to encompass all transitions between strips of different subsets—thus not all transitions between image points of different part images or half-images—by way of determining averaged intensity values in the described manner. It can be sufficient if only those transitions which are visible to the tracked viewer are treated in the described manner, preferably accordingly to their visibility. Tracked viewers with this are to be indicated as viewers for who the head position or eye positions are determined, in order to activate the screen depending on the detected head positions or eye positions. Transitions are indicted as the regions along the edges of the strips of subpixels 3, at which the adjacent strips of the different subsets on the subpixel matrix 2 contact or overlap.

The invention claimed is:

1. An autostereoscopic screen for simultaneously displaying a plurality of at least two different images such that each of these images is visible from at least one of different viewing zones which are laterally offset relative to one another, in front of the screen,
   comprising a subpixel matrix with a multitude of subpixels, an optical element arranged in front of or behind the subpixel matrix, and a control unit for activating the subpixel matrix,
   wherein the control unit is configured to define, on the subpixel matrix a number of subsets of subpixels which corresponds to said plurality, such that each of the subsets forms a family of parallel strips and is assigned to at least one of the viewing zones which by way of this is unambiguously assigned to this subset, wherein the strips of the different subsets cyclically alternate and wherein directly adjacent strips of the strips of at least two of the subsets overlap, so that subpixels contained in an intersection of the two overlapping subsets form a band of subpixels, the band of subpixels having a width of at least one subpixel and lying along a margin of two of the strips,
   to determine, for each of the subpixels contained in the intersection, an averaged intensity value by way of adding a first intensity value multiplied by a first weighting factor and a second intensity value multiplied by a second weighting factor, the first weighting factor and the second weighting factor depending on a displacement value(s) related to a lateral displacement of a head position or eye positions of a viewer,
   and to activate the subpixels of the subpixel matrix in dependence on image data of the images, such that each of the images is reproduced on one of the subsets of subpixels and that the subpixels contained in the intersection are activated with the averaged intensity values,
   wherein the first intensity value is defined by the image data of the image reproduced on a first of the two overlapping subsets and the second intensity value is defined by the image data of the imam represented on a second of the two overlapping subsets,
   wherein the optical element has a grating-like structure aligned according to the strips for leading light departing from the subpixels of each of the subsets into the viewing zone assigned to this subset.

2. The screen of claim 1, wherein the control unit is configured to deduce or compute, from the image data of each of the images, intensity values for the subpixels as a function of location coordinates of the subpixels or of location coordinates of pixels formed by in each case several of the subpixels and to determine the averaged intensity value for each of the subpixels from the intersection, by way of the first intensity value being selected as the intensity value defined by the image data of the image reproduced on the first subset for the location coordinates of this subpixel or of the pixel containing this subpixel, whilst the second intensity value is selected as the intensity value defined by the image data of the image reproduced on the second subset for the location coordinates of this subpixel or of the pixel containing this subpixel.

3. The screen of claim 1, wherein the plurality of the images and subsets is two in each case.

4. The screen of claim 1, wherein the control unit is configured to define the subsets such that with the exception at the most of a strip lying to the very outside, all strips at least of one of the subsets, in each case at at least one edge, comprise a band of subpixels which belong to the intersection.

5. The screen of claim 1, wherein the two weighting factors assume values between zero and one, wherein the first weighting factor monotonously decreases with an increasing displacement value(s) and the second weighting factor monotonously increases with an increasing displacement value(s), or wherein the first weighting factor monotonously increases with an increasing displacement value(s) and the second weighting factor monotonously decreases with an increasing displacement value(s).

6. The screen of claim 1, wherein it comprises a tracking device for detecting a head position or eye positions of at least one viewer, wherein the control unit or evaluation electronics of the tracking device is configured to determine the displacement value(s) in dependence on an output signal of the tracking device or of a detector of the tracking device.

7. The screen of claim 1, wherein the control unit is configured to determine correction values from the image data via a filter function depending on a difference between intensity values for subpixels of the same colour which lie closest to one another in the line direction and are from the overlapping subsets, and to determine the averaged intensity values, with which the subpixels within the mentioned intersection are activated, in a manner depending on these correction values.

8. The screen of claim 1, wherein the optical element is given by a parallax barrier or by a lenticular lens.

9. The screen of claim 1, herein the subpixel matrix is given by a LCD.

10. A method for reproducing image information by simultaneously displaying a plurality of at least two different images on an autostereoscopic screen such that each of the images is visible from at least one of different viewing zones which are laterally offset relative to one another, the method comprising:
  defining, on a subpixel matrix of the autostereoscopic screen having a multitude of subpixels, a number of subsets of subpixels which corresponds to the mentioned plurality, such that each of the subsets forms a family of parallel strips and is assigned to at least one of the viewing zones which by way of this is unambiguously assigned to this subset, wherein the strips of the different subsets cyclically alternate and wherein directly adjacent strips of the strips of at least two of the subsets overlap such that subpixels contained in an intersection of the two overlapping subsets form a band having a width of at least one subpixel and lying along a margin of two of the strips;
  determining, for each of the subpixels contained in the intersection, an averaged intensity value by way of adding a first intensity value multiplied by a first weighting factor and a second intensity value multiplied by a second weighting factor, the first weighting factor and the second weighting factor depending on a displacement value(s) related to a lateral displacement of a head position or eye positions of a viewer;
  activating the subpixels of the subpixel matrix in dependence on image data of the images, such that each of the images is reproduced on one of the subsets of subpixels and that the subpixels contained in the intersection are activated with the averaged intensity values; and
  leading, by means of a grating-like structure aligned according to the strips and arranged in front of or behind the subpixel matrix, light coming from the subpixels of each of the subsets into the viewing zone assigned to this subset,
  wherein the first intensity value is defined by the image data of the image reproduced on a first of the two overlapping subsets and the second intensity value is defined by the image data of the image represented on a second of the two overlapping subsets.

11. The method of claim 10, wherein from the image data of each of the images, intensity values for the subpixels are deduced or computed as a function of location coordinates of the subpixels or of location coordinates of pixels which are each formed by several of the subpixels, and the averaged intensity value is determined for each of the subpixels from the intersection, by way of the first intensity value being selected as the intensity value defined by the image data of the image reproduced on the first subset for the location coordinates of this subpixel or of the pixel containing this subpixel, whilst the second intensity value is selected as the intensity value defined by the image data of the image reproduced on the second subset for the location coordinates of this subpixel or of the pixel containing this subpixel.

12. The method of claim 10, wherein the simultaneously shown images are stereoscopic half-images corresponding to one another, wherein the mentioned plurality of the images and subsets in each case is preferably two.

13. The method of claim 10, wherein the subsets are to be defined such that with the exception at the most of a strip lying at the very outside, all strips of at least one of the subsets, in each case at at least one edge, comprise a band of subpixels which belong to the intersection.

14. The method of claim 10, wherein a head position or eye positions of at least one viewer are detected, wherein the displacement value(s) is determined in dependence on the detected head position or the detected eye positions.

15. The method of claim 10, wherein the averaged intensity values, with which the subpixels within the mentioned intersection are activated, are determined depending on image contents of the two images reproduced on the overlapping subsets.

* * * * *